United States Patent [19]
Yamaura et al.

[11] Patent Number: 5,571,301
[45] Date of Patent: Nov. 5, 1996

[54] APPARATUS FOR MAKING CRYSTALLIZED GLASS

[75] Inventors: Takeshi Yamaura, 4-5-7, Akitsu, Narashino-shi, Chiba-ken; Takatsugu Ogata, Hannoh; Yoshikazu Nagayoshi, Tokyo; Keiichiro Miyano, Tokyo; Kenji Suzuki, Tokyo, all of Japan

[73] Assignees: Tsukishima Kikai Co., Ltd., Tokyo; Takeshi Yamaura, Chiba-ken, both of Japan

[21] Appl. No.: 253,651

[22] Filed: Jun. 3, 1994

[51] Int. Cl.$^6$ ................................ C03B 3/00
[52] U.S. Cl. .................. 65/335; 65/33.1; 65/134.8; 65/134.7; 65/134.6; 65/181; 65/346; 65/347; 65/348; 588/256; 588/257; 588/900
[58] Field of Search .................. 65/134.6, 134.7, 65/134.8, 134.9, 33.1, 33.7, 33.9, 335, 346, 347, 348; 588/900, 256, 257

[56] References Cited

U.S. PATENT DOCUMENTS

| | | | |
|---|---|---|---|
| 1,994,959 | 3/1935 | Morton | 65/134.6 |
| 3,073,708 | 1/1963 | Krøyer | 106/52 |
| 3,244,993 | 4/1966 | Cala | 65/134.9 |
| 3,615,307 | 10/1971 | Jones, II | 51/309 |
| 3,958,518 | 5/1976 | Yoshida | 588/900 X |
| 4,042,362 | 10/1977 | McDowell et al. | 65/33.1 |
| 4,209,421 | 6/1980 | Heimerl et al. | 65/33.8 X |
| 4,314,909 | 2/1982 | Beall et al. | 65/33.9 X |
| 4,659,356 | 4/1987 | Lawhon et al. | 65/335 X |
| 4,666,490 | 5/1987 | Drake | 588/900 X |
| 5,273,566 | 12/1993 | Balcar et al. | 65/134.8 X |

FOREIGN PATENT DOCUMENTS

| | | |
|---|---|---|
| 0071110 | 2/1983 | European Pat. Off. . |
| 0230049 | 7/1987 | European Pat. Off. . |
| 679681 | 4/1930 | France . |
| 2120115 | 8/1972 | France . |
| 2325612 | 4/1977 | France . |
| 9302137.2 | 6/1993 | Germany . |
| 1379085 | 1/1975 | United Kingdom . |
| WO93/01141 | 1/1993 | WIPO . |

*Primary Examiner*—Donald E. Czaja
*Assistant Examiner*—Sean Vincent
*Attorney, Agent, or Firm*—Finnegan, Henderson, Farabow, Garrett & Dunner, L.L.P.

[57] ABSTRACT

An apparatus is presented for economically making crystallized glass products from waste ash produced from the sewage sludge dewatered by organic matters, which is usually regarded to be difficult to process. The melting is performed in two furnaces: the primary melting furnace and the secondary melting furnace. The primary furnace melts waste ash and the primary melt is charged into the secondary melting furnace. The glassy material produced in the secondary melting furnace is charged into a crystallization furnace to convert the glassy material to a crystallized glass product. This basic configuration of the apparatus allows the production of either irregular shaped crystallized products, such as crushed stone like products, or crystallized manufactured products, such as tiles and blocks, depending on the combination of processing equipment and their operating conditions. The apparatus enables the production of crystallized glass products from waste ash feed economically, because of the flexibility and versatility in the design of the apparatus.

5 Claims, 4 Drawing Sheets

APPARATUS FOR MAKING CRYSTALLIZED GLASS

BACKGROUND OF THE INVENTION

1. Field of the Invention

The present invention relates in general to a method for making crystallized glasses, and relates in particular to a method for making crystallized glass products from waste ashes produced from incinerating sludges and industrial and public wastes.

2. Technical Background with increasing concern for preservation of environment, there is an increasing recognition for the importance of reducing and recycling waste materials. Effective utilization of sludges produced from sewage and industrial water treatment facilities is also an important aspect of reducing the need for landfill and preserving the natural environment.

The present invention relates to an apparatus for producing products similar to such materials as pebbles, stones, and crushed stones, and to an apparatus for producing such manufactured products as tiles and blocks, using the method for producing crystallized glasses which has been disclosed earlier in a Japanese Patent Application, First Publication, H2-413772.

There are conventional furnaces for melting waste ash materials produced from incinerating sewage sludge and other types of wastes, such as rotary furnaces, coke beds (or vertical shaft furnaces), surface melting furnaces, arc furnaces, plasma furnaces and microwave melting furnaces. However, the slags produced from these conventional melting furnaces are glassy types which are only useful as low grade construction materials such as road fill. There has been proposals to slowly cool or treat the melted materials to produce crystallized aggregates. The crystallized aggregates made by such methods (Japanese Patent Application, First Publication, S56-54248, Japanese Patent Application, First Publication S56-54247) are used as concrete admixtures.

The crystallized glass products made by the method of the present invention are far superior to those made by the conventional methods mentioned above, and the details of this method has already been disclosed in a Japanese Patent Application, First Publication H2-413772.

The building materials using crystallized glass are made by two approaches: one approach is to melt a feed material of an appropriately adjusted composition in a conventional glass furnace and after making formed glass, heat treating and crystallizing steps are performed on the formed glass; the other approach is to prepare particulate shaped glass first from a melt, and shaped glass is made by heat treating and crystallizing step is performed on the shaped glass. However, there has been no proposal for an apparatus using waste materials for feed and making crystallized glass products tailored to the end applications.

Applications of crystallized glass products for construction and building purposes are broadly divided into two categories: one is a group of irregular shaped products such as pebbles and crushed stones; and the other is a group of shaped products such as tiles and blocks. The irregular shaped products can be used in their original condition or used as raw material for secondary products as in the case of foundation stones or aggregates for terrazzo tiles. In either case, the end applications must be compatible with the characteristics of the crystallized glass, and used in applications having relatively high added value. For formed glass product applications, tiles and blocks can be used in interior applications such as decorative blocks and boundary stones, which are high-value-added products but correspondingly, the quality demands are also high. Therefore, it becomes important that an apparatus for making crystallized glass be constructed in line with the economic requirements, such as capital and operating costs, of the end products.

In considering the equipment for making crystallized glasses and products, the essential components are melting furnace, shaping apparatus and crystallization furnace.

With respect to the choice of the melting furnace, it is considered that the conventional glass melting furnaces are unsuitable because of the following three reasons. First, waste materials as feed to the melting furnace are quite variable in size and quality, they can vary from waste containing organic substances to nearly inorganic small sized particles of several tens of micrometers such as fly ashes from incinerators. Second, the ash compositions produced from the waste materials are multi-component, and the melt is highly corrosive to the refractories of the melting furnace. Third, it is necessary to satisfy production conditions for producing iron sulfide as a nucleating agent from iron oxide and sulfur compounds.

With respect to making irregular shaped crystallized glass products in the shapes of sand, particles, crushed stones and small lumps, manufacturing cost must be low because they have low added values, and it is necessary to shorten the processing time. Especially for the crystallization step, roller hearth kilns or tunnel kilns used as crystallization furnace for formed blocks, bricks and tiles are unsuitable because of their long processing times, and the large size of the equipment. They are also heavy consumers of fuel, thus increasing the operating cost.

Other problems with making the crystallized glass products are associated with the properties of the melt made from waste ash materials. Ordinary glasses exhibit good forming and malleability even at temperatures as low as 700° to 800° C., but the melt has a tendency to harden below about 900° C. If there is a large temperature difference existing between the surface and the interior when making crystallized glass products, cracking may appear during the glass formation stage, or if large internal stresses are left in the glass, it may lead to cracking during the crystallization step. Therefore, it is necessary to control the cooling rate during the glass formation stage, and the conventional glass forming methods such as roll-drawing cannot be applied, because of the lack of thermal shock resistance of the formed glass and the difficulty of temperature control. Further, the method of melting and adhering small glass particles during the crystallization step is difficult to be used because the recycled glass is difficult to be softened before the crystallization temperature is reached.

SUMMARY OF THE INVENTION

The apparatus of the present invention resolves the problems in the existing apparatus for making crystallized glass products, and an objective is to present an apparatus which enables to produce various crystallized glass products, that is irregular shaped products such as crushed stone like products and shaped, i.e. formed, products such as tiles and blocks, at the costs commensurate with their respective added values.

This objective is achieved in an apparatus for making a crystallized glass product by melting a waste ash material containing organic matters, producing a glassy material and subjecting the glassy material to a crystallization step to produce the crystallized glass product, the apparatus comprising: a hopper for storing the waste ash material; a hopper for storing a feed composition adjuster; a mixer for mixing materials supplied by the hoppers to make a mixed feed material; a constant rate feeder for supplying the mixed feed material for melting; a primary melting furnace of a circular type for producing a primary melt; a secondary melting furnace operatively connected to the primary melting furnace for homogenizing, defoaming and forming nuclei in the primary melt; a cooling and shaping apparatus disposed at the melt discharge end of the secondary melting furnace for producing a glassy material; and a crystallization furnace disposed at the discharge end of the cooling and shaping apparatus for converting the glassy material to the crystallized glass product.

According to the apparatus for making crystallized glass products of the construction described above, the apparatus constructed so as to permit the melting step to be separated into two steps, that is, the primary melting of mixed feed material to produce the primary melt, and the secondary melting of the primary melt to homogenize, defoam and forming nuclei in the primary melt in preparation for crystallization treatment. The apparatus is thus able to handle a wide variety of feed materials from waste materials containing organic matters, to fine dust-like materials such as fly ash. Once the primary melt is prepared, it is then subjected to controlled condition of heating in the secondary melting to ensure that the glassy material will be converted to crystallized products as economically as possible.

According to another aspect of the apparatus, the cooling and shaping apparatus enables to produce glassy irregular shaped particles, and the crystallization furnace of a rotary kiln type converts glassy irregular shaped particles to crystallized irregular shaped particles. Therefore, the versatile design of the basic apparatus enables the production of irregular shaped crystallized products efficiently and economically.

According to another aspect of the apparatus, the cooling and shaping apparatus produces a glassy shaped material, and the crystallization furnace converts the glassy shaped material to a crystallized formed glass product. Therefore, the versatile design of the basic apparatus enables also the production of shaped crystallized products efficiently and economically.

According to another aspect of apparatus, the composition of the waste ash material is optionally adjusted with CaO compounds to facilitate the production of the crystallized glass product. This assures that the composition is suitable for forming nuclei and the finally crystallized products will be of uniform quality.

According to yet another aspect of the apparatus, the exterior of the primary melting furnace is force cooled to promote the formation of a self-lining made of a solidified primary melt on the interior wall of the primary melting furnace. This design achieves the dual purpose of not only protecting the lining of the primary furnace, but also of trapping the fly ash type mixed feed material which is generally difficult to melt efficiently.

According to yet another aspect of the apparatus, the crystallization furnace controls the temperature of nuclei formation in five to thirty minutes duration and the temperature of the main crystal formation temperature in ten minutes to two hour duration. The apparatus is designed to achieve this processing so as to permit the production of irregular shaped products at an optimum production cost.

According to yet another aspect of the apparatus, the cooling and shaping apparatus performs cooling so as to maintain the temperature difference between the interior and the exterior of the formed glassy material to within 100° C., and the crystallization furnace performs temperature increase at a rate of 5° C. per minute to crystallize the formed glassy material. The apparatus is designed carefully to achieve the required degree of temperature distribution within the furnace so that the final crystallized products will be free of cracks and the chances of fracture will be minimized.

According to yet another aspect of the apparatus, the crystallization furnace is provided with a nuclei forming chamber and a main crystal growth chamber formed inside a rotary cylinder section; primary and secondary temperature adjusting devices for adjusting the temperatures of the flue gas from the primary melting furnace; a flue gas exit for removing the exhaust gas; and dams for retaining the glassy material. The apparatus is thus designed to maximize energy conservation and fuel utilization during the melting step of the process.

According to the final aspect of the apparatus, the primary melting furnace recirculates the heat from the flue gas through an air pre-heater, and the crystallization furnace is provided with devices to lower the flue gas temperature before admitting the flue gas. The apparatus is thus designed to maximize energy conservation and fuel utilization during the crystallization step of the process.

PREFERRED EMBODIMENTS

Figure 1:
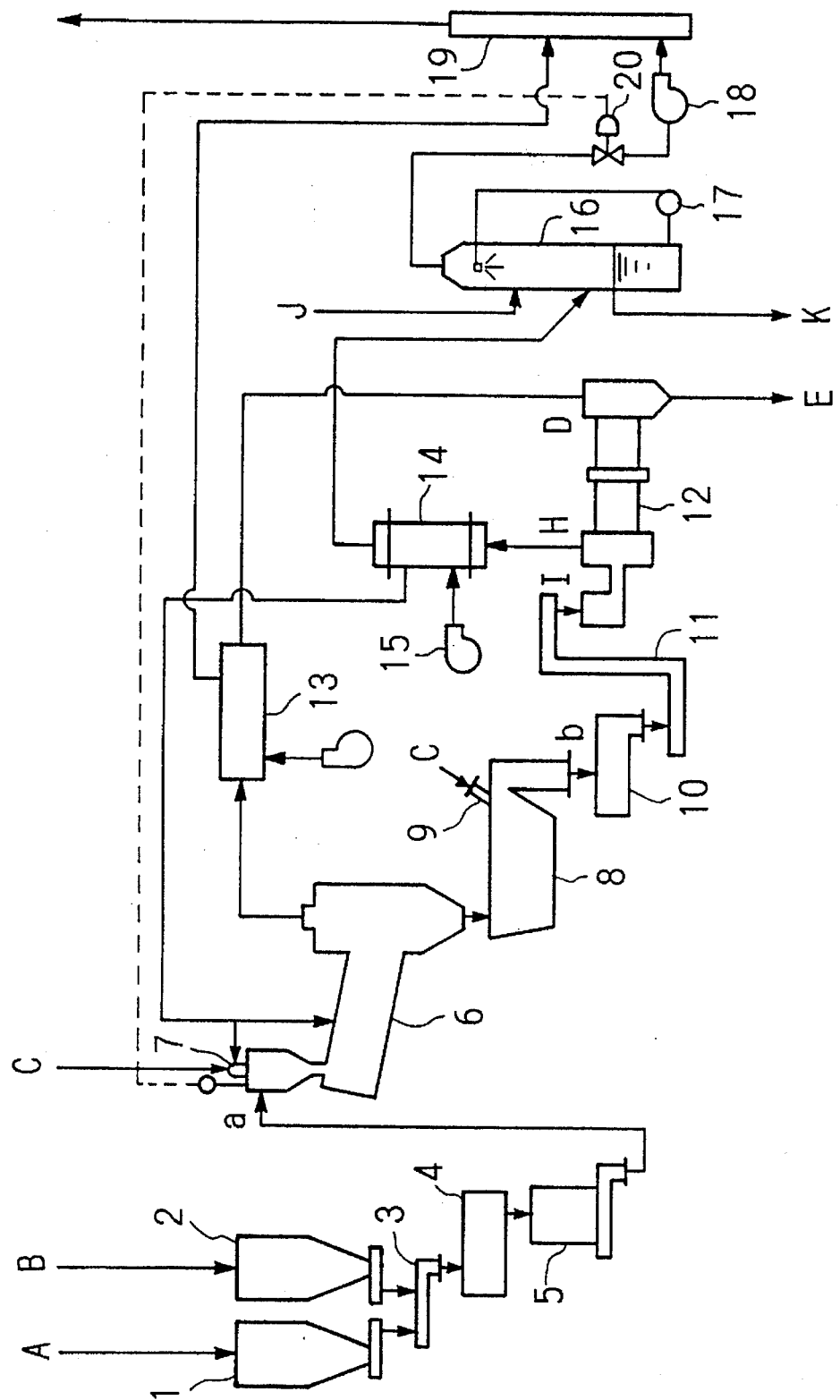
FIG. 1 is a schematic block diagram for an example of the apparatus of the present invention for making irregular shaped crystallized glass products.

Outlines of the process of making crystallized glass products using the apparatus of the present invention will be presented first.

Sludges containing organic matters such as from sewage treatment or waste materials, such as incinerator ash which can easily be scattered, are melted in a circular furnace serving as a primary melting furnace at temperatures between 1300° to 1400° C. to incinerate organic matters, and to melt the ash content in an oxidizing atmosphere. The primary melt from the primary melting furnace is received in a secondary melting furnace connected to the primary melting furnace and having heating devices such as combustion burners or plasma heaters. The primary melt is held at temperatures between 1400° to 1500° C. while subjecting the interior of the melt to a suitable reducing condition so as to homogenize the melt, to defoam the melt and to generate iron sulfide which acts as a nucleating agent. The outside portion of the melting furnace opposite to (the inner wall touched by) the melt is thermally insulated under forced cooling to promote the formation of a self-lining made of the solidified primary melt on the interior wall of the furnace.

For making irregular shaped crystallized glass products, the quality demands are less than for the crystallized and formed glassy products. Therefore, the duration of treatment in the secondary melting furnace can be from fifteen minutes to one hour. The glass formation step can be performed in a slag cooling apparatus (for example, Japanese Utility Model, First Publication, H3-83691) to produce glass particulates, crushed stone-like particles and small agglomerates falling within a certain range of sizes. Crystallization is performed in a rotation furnace of a kiln type which can control the temperature for nuclei formation in five to thirty minutes duration and the temperature for main crystal formation in ten minutes to two hour duration. The furnace for this purpose should be a simplified circular type furnace which would not affect the quality of the glass greatly even if the glass particles to be crystallized are mixed or disturbed otherwise. Further economy in the processing cost is achieved by recirculating the flue gas from the melting furnace, and adjusting the gas temperature by cooling before admitting the gas to the crystallization furnace, thus avoiding the consumption of new energy.

The present invention has thus enabled to have a crystallized glass making apparatus of simple construction as described above, and to utilize the crystallized glass as aggregates for such applications as terrazzo tiles and blocks as alternative to marbles and granite.

In making formed crystallized glass products, it is necessary to perform homogenization and defoaming in the melting furnace sufficiently, therefore the duration of processing in the secondary furnace becomes longer than one hour. The operation of the cooling and shaping apparatus must also be carried out with particular attention to temperatures. The metal mold used for providing the shape must be preheated to 400° to 600° C. to ensure that the surface of the shaped product does not fall below 800° C. After the temperature of the metal mold stabilizes, cooling is commenced in such a way to ensure that the temperature difference does not exceed 100° C. between the interior and the exterior of the shaped product. The shaped product must reach a temperature below 700° C. to ensure that the shaped product has as little cracks and stresses. To ensure that the shaped product remains sound at room temperature, it is necessary that the temperature difference of less than 100° C. between the interior and exterior be maintained to a temperature below 200° C.

These and other requirements of the apparatus and the process will become apparent from the following descriptions of the examples presented with reference to FIGS. 1 to 5.

Figure 2:
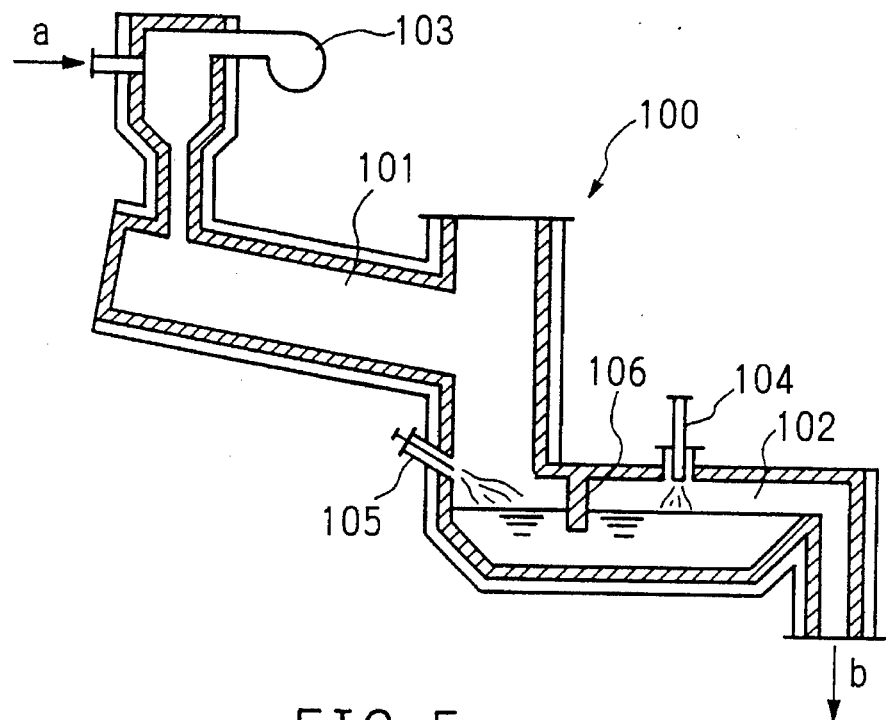
FIG. 2 is an example of the primary melting furnace.

FIG. 1 is a block diagram of an example of a facility for producing crystallized glass product in the form of crushed stones. The reference numeral 1 refers to a main hopper containing incineration ash A of a pre-analyzed composition, and an auxiliary hopper 2 for lime stone B to adjust the composition of the feed material. A mixer 4 is connected to the discharge ends of the hoppers 1, 2 through a feed conveyor 3. A constant rate feeder 5 of a turn-table type is connected to the discharge end of the mixer 4. A primary melting furnace (circular furnace) 6 is connected to the constant rate feeder 5. A burner 7 using heavy oil C as the fuel is provided on the primary melting furnace 6. The primary melting furnace 6 is inclined from a high material end, i.e., where the burner 7 is located, to a low end connected to a secondary melting furnace 8. The secondary melting furnace 8 is horizontally disposed and is connected to the primary melting furnace 6, and the secondary melting furnace 8 is provided with a burner 9 using heavy oil as the fuel. FIG. 2 shows an alternative arrangement of the melting furnaces 6, 8. In this arrangement, one melting furnace 100 is divided into two sections, in which the fore-furnace is made into a rotary melting chamber 101, and the aft-furnace is made into a secondary melting chamber 102. In this case, the feed composition adjuster "a" is supplied to the circular melting chamber 101 which is heated by a burner 103. The secondary melting chamber 102 is provided with a plasma burner 104 and a burner 105, and a divider 106 is hanging from the upper wall. The secondary melt "b" from the secondary melting chamber flows over its discharge end.

Returning to FIG. 1, a cooling and shaping apparatus 10 is disposed at the melt discharge end of the secondary melting furnace 8. A crystallization furnace 12 of a rotary kiln type is disposed at the discharge end of, the cooling and shaping apparatus 10 with an intervening glass transport device 11.

Figure 3:
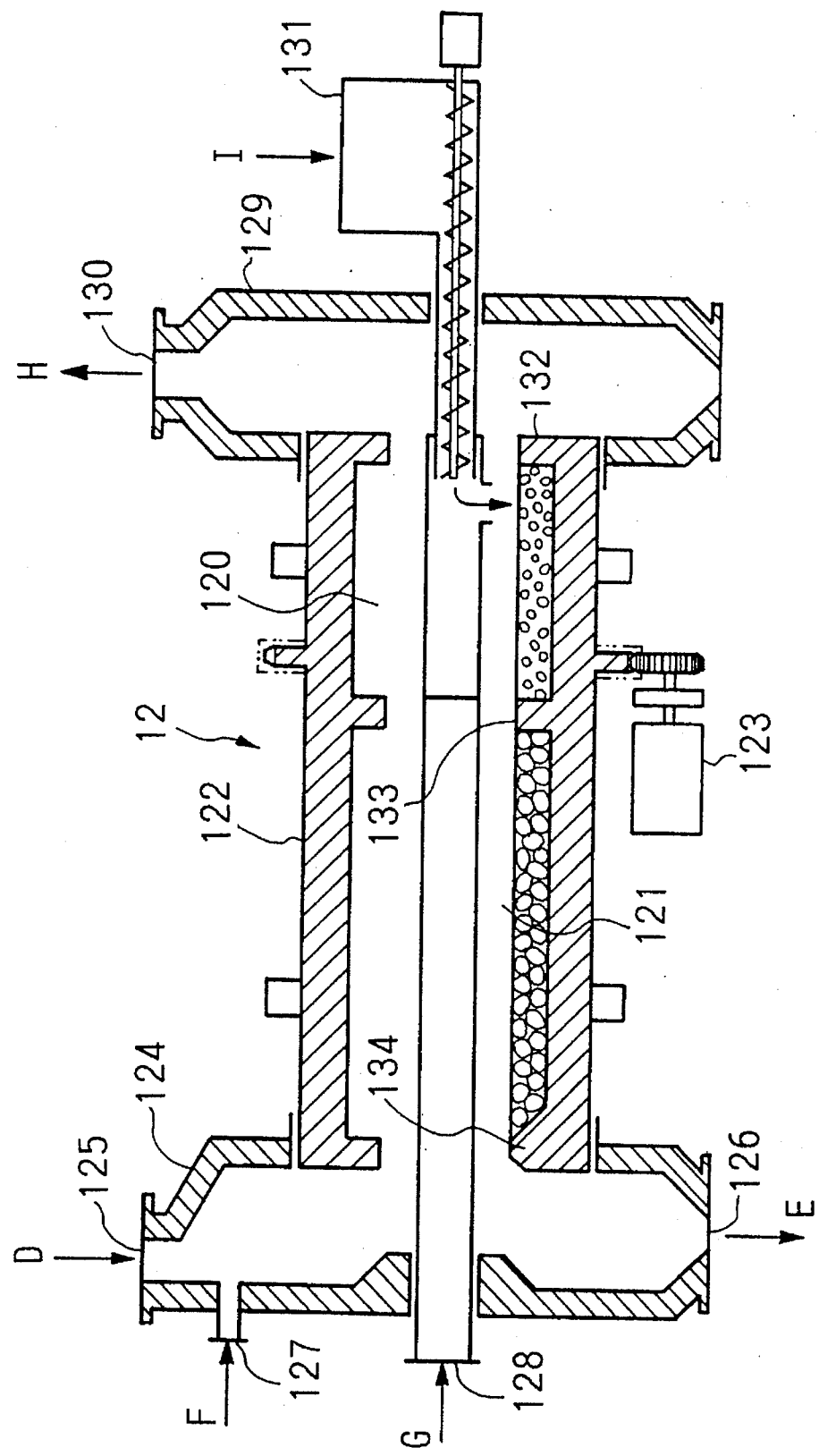
FIG. 3 is an example of the crystallization furnace.

As shown in FIG. 3, this crystallization furnace 12 has a nuclei forming chamber 120 and a main crystal growth chamber 121 formed inside a rotary cylinder section 122 which is driven by an electric motor 123. One end of the rotary cylinder 122 is a stationary section 124 having a flue gas inlet 125 for admitting the flue gas D from the primary melting furnace 6, and a product discharge opening 126 for discharging the crystallized product (crystallized glass product) E, as well as primary and secondary temperature adjusting devices 127, 128 for adjusting the temperatures of the flue gas D by supplying air streams F, G. The opposite stationary section 129 of the rotary cylinder 122 is provided with a process gas exit 130 for exhausting the process gas H as well as a glass supply device 131 for supplying small lumps of glassy feed material I into the rotary furnace 12. A given amount of the glassy feed material is retained in the nuclei forming chamber 120 and the main crystal growth chamber 121 by the provision of the dams 132, 133 and 134.

The heat from the flue gas D of the primary melting furnace 6 is supplied to the crystallization furnace 12 through a flue gas temperature adjuster 13. An air preheater 14 is connected to the process gas exit 130 of the crystallization furnace 12. The air preheater 14 is a multi-tube heat exchanger, and is designed to preheat the air supplied by the combustion blower 15, so as to supply heated air to the primary melting furnace 6. The process gas from the air preheater 14 is forwarded to a gas scrubbing tower 16 of a spray tower type. The gas scrubbing tower 16 is provided with a circulation pump 17 for circulating the cooling liquid, and with a chimney 19 having a suction blower 18. A pressure adjustment damper 20 is provided at the entry end of the suction blower 18, and the interior pressure of the primary melting furnace 6 is kept constant by the damper 20. The air which has passed through the flue gas temperature adjuster 13 is discharged from the chimney 19 preventing the formation of a white smoke discharge.

The process of producing crystallized glass products from waste ash using the apparatus of the above-described construction will be explained in the following. The example given below is a case of producing two tons/day of a crushed stone-like crystallized glass product from waste ash generated from dehydrated sludge cake made by using polymer coagulating agents.

First, a pre-analyzed waste ash A (to ascertain that the composition is suitable for producing crystallized glass products) and the calcined limestone B, as the feed composition adjuster, are discharged from the hoppers 1, 2 in a specific quantitative amount, and are forwarded to the mixer 4 by way of the feed conveyor 3. After mixing the waste ash A and the calcined limestone B thoroughly in the mixer 4, the adjusted feed mixture "a" is stored in the constant rate feeder 5. A specific amount of the adjusted feed mixture "a" is supplied continuously by air transport to the primary melting furnace 6 from the turn table of the constant rate feeder 5. The primary melting furnace 6 has been heated to 1350° C. by the burner 7 using heavy oil fuel C. The adjusted mixture "a" transported by air from the constant rate feeder 5 is blown tangentially into the primary melting furnace 6, and is directed against the wall of the furnace by a centrifugal force. The wall of the primary melting furnace 6 has already been coated with a covering layer of the previously melted and solidified primary melt of the waste ash, and the newly supplied waste ash "a" is trapped in the covering layer. The trapped waste ash "a" is melted by the actions of the heat conducted from the covering layer and the radiant heat. The melt flows down to the bottom of the primary melting furnace 6 from which it flows down into the secondary melting furnace 8. The secondary melting furnace 8 is kept at about 1600° C. by the heavy oil burning burner 9, and the primary melt supplied to the secondary melting furnace 8 is radiatively heated to 1450° C. to make a secondary melt. The secondary melt is retained in the secondary melting furnace 8 for not less than 15 minutes so as to equalize the temperature to homogenize the melt and removing gaseous products (defoaming) entrapped in the interior of the melt or generated by various reactions. The secondary melt "b" dropped from the secondary melting furnace 8 into the cooling and shaping apparatus 10 is made into small lumps I, is transported by the glass transport device 11, and is sent into the interior of the crystallization furnace 12 by the glass transport device 131 of the crystallization furnace 12, as illustrated in FIG. 3. The heat of the flue gas D from the primary melting furnace 6 is supplied to the crystallization furnace 12 after being removed of flying dust particles in the flue gas temperature adjuster 13, and being adjusted to a set temperature of the crystallization furnace 12. The small lumps I are heated and retained in the nuclei forming temperature range, between 800° to 900° C., of the chamber 120 for not less than 15 minutes. The small lumps I are then sent to the main crystal growth chamber 121 and are held in the crystal growth temperature range, between 1000° and 1100° C., for not less than 15 minutes in the main crystal growth chamber 121. The crystallized glass product E thus formed is dropped from the product exit 126 and is collected. The process gas H from the crystallization furnace 12 is sent to the air pre-heater 14 to recover heat. The air heated by the pre-heater 14 is supplied to the primary melting furnace 6, and the process gas from the pre-heater 14 is sent to the gas scrubber tower 16 to clean the gas. The gas scrubber 16 is supplied with input water J and the scrubbing water is circulated by the circulating pump 17, and a part of the scrubbing water is expelled out of the system as discard water K. The exhaust gas cleaned in the scrubbing tower 16 is withdrawn by the suction blower 18 and is exhausted from the chimney 19.

The results obtained from the operation of the crystallized glass making apparatus will be presented in the following.

First, some examples of the compositions of the waste ashes produced from the sewage sludge dewatered by polymer matters are shown in Table 1. In this table, $Y=CaO/(SiO_2+Al_2O_3)$.

The melting conditions for melting the adjusted ashes A, B and C are shown in Table 2, and the types of irregular glass samples, the heat treating conditions for these irregular glass samples and the evaluation results are shown in Table 3.

The evaluation test in Table 3 were performed by crushing the irregular glass samples with a hammer, and observing the fragments with a magnifying glass (×8). The results were reported in terms of a circle for those samples which produced particles of less than 0.3 mm size, a triangle for those samples which showed crystallization but the fragments were larger than 0.3 mm size, and a cross for those samples having uncrystallized center portion.

The properties of the crystallized glass samples 1 to 9 shown in Table 3 are reported in Table 4 together with the test results for natural marble for comparison. The resistances to acid attack and alkaline attack were evaluated by measuring the weight loss after immersing a sample of 15×15×10 mm size for 250 hours at 25° C. in an acid solution (5% $H_2SO_4$) and in an alkaline solution (5% NaOH).

As evident from the results in Table 4, the crystallized glass samples prepared in the apparatus of the present invention are superior to natural marble in their strength and chemical properties, and that they can be used as aggregates without causing any problems.

Evaluation tests were performed by making terrazzo tiles using the irregular shaped crystallized glass samples from Table 3 and the natural marble. The terrazzo tiles in this case were produced by hardening mostly crushed natural marble as aggregates with cement, and finished by polishing to make the tile resemble the color tones of natural stones. The aggregate mixing conditions and the evaluation results of the terrazzo tiles thus produced are reported in Table 5 together with JIS (Japanese Industrial Standards) requirements for the terrazzo tiles.

The results shown in Table 5 confirmed that the products made by the crystallized glass aggregate materials of the present invention are able to produce secondary manufactured products having properties equal to or better than those of the natural marble sample.

Next, the basic apparatus configuration of the present invention was applied to making tile and block shaped samples of 40 to 50 mm squares and 10 to 100 mm thickness from dehydrated cakes of waste ashes containing polymer matters.

Figure 4:
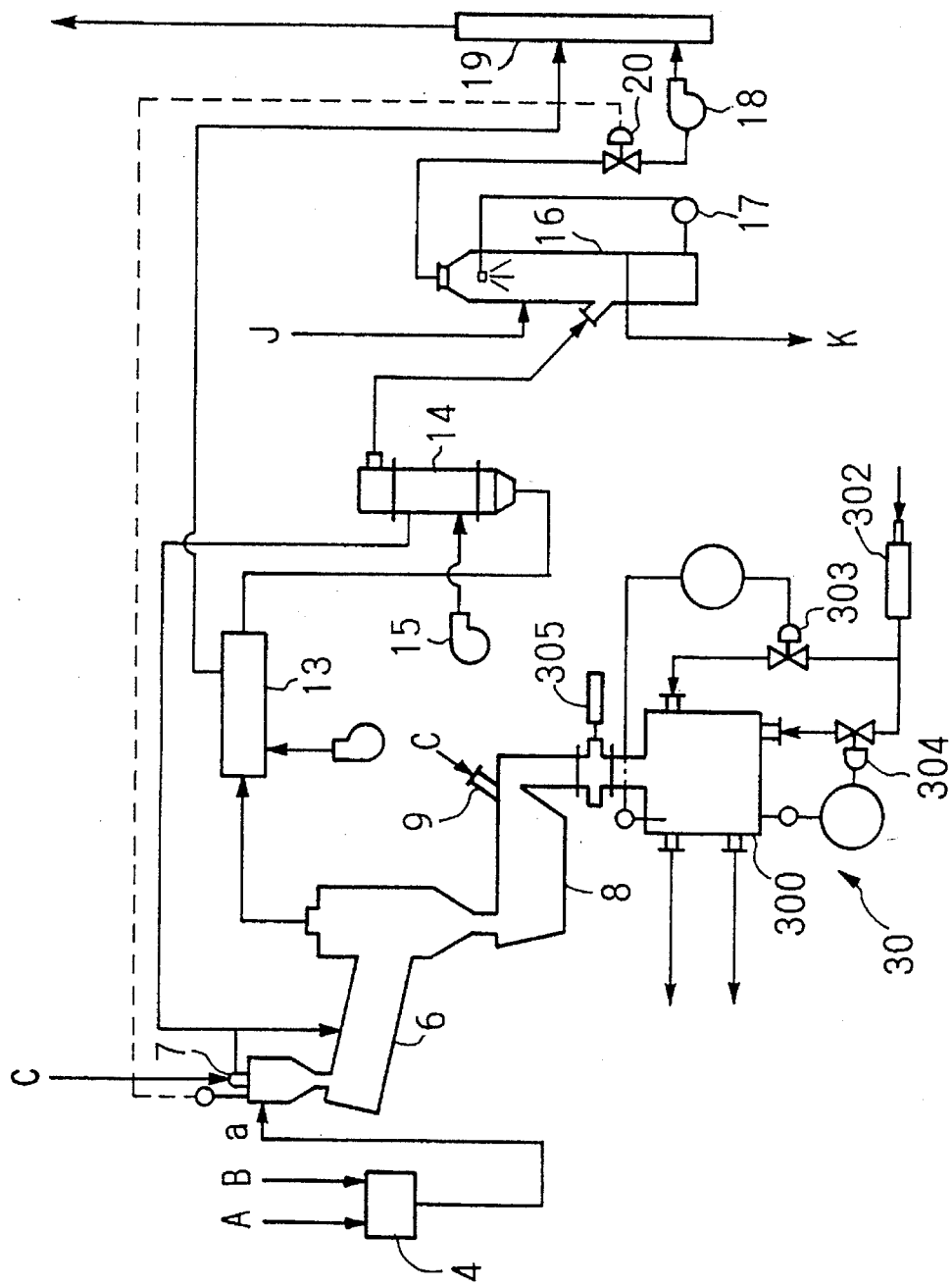
FIG. 4 is a schematic block diagram of an example of the apparatus of the present invention for making formed crystallized glass products.

FIG. 4 shows a block diagram of an example of the facility for producing crystallized shaped glass products, such as tiles and blocks. This facility is similar to that shown in FIG. 1 for making irregular-shaped crystallized glass products. The differences between the apparatus of this example and that for making irregular shaped products are that the previous cooling and shading apparatus 10, the glass transport device 11 and the crystallization furnace are replaced by a shaping apparatus 30 and a crystallization furnace (not shown) which is an ordinary electric furnace.

Figure 5:
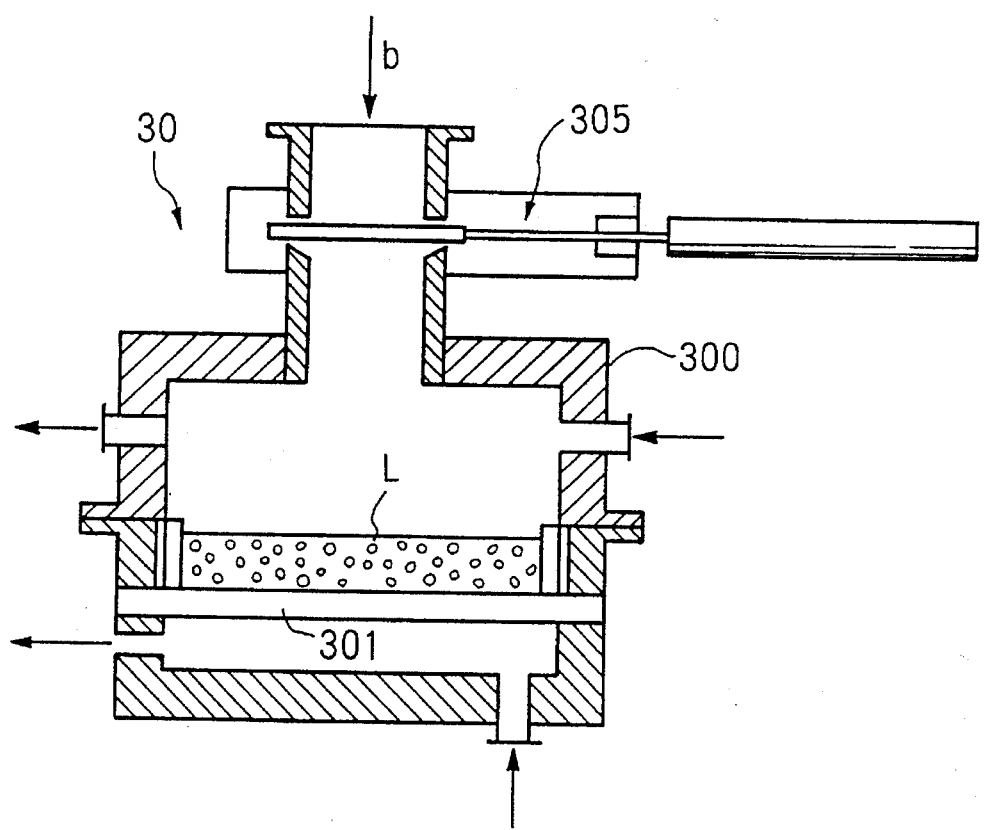
FIG. 5 is an example of a cooling and shaping apparatus.

The above shaping apparatus 30, as illustrated in FIGS. 4 and 5, has a main body 300 and a separable lower mold 301. The spaces above and below the lower mold 301 are provided with a temperature adjusting device 302 for supplying heating gas (or cooling gas) via temperature adjusting dampers 303, 304. The upper section of the main body 300 is provided with a shut-off valve 305.

In the following, the process of making crystallized glass tiles and block products of 50 to 400 mm squares and 10 to 100 mm thickness from the waste ashes produced from the sewage sludge dewatered by polymer matters will be described.

First, pre-analyzed waste ashes A and the composition adjuster (calcined limestone) B were-mixed thoroughly in a mixer 4 to produce a feed mixture of a suitable composition for producing crystallized glass, and continually charged into the primary melting furnace 6. The primary melting furnace 6 has been pre-heated to 1400° C. with a burner 7 using heavy oil C. The feed mixture "a" transported by air is charged into the primary furnace 6 tangentially, and is directed against the wall of the furnace by a centrifugal force. The wall of the primary melting furnace 6 has already been pre-coated with a covering layer of the previously melted and solidified primary melt of the waste ash, and the newly supplied waste ash "a" is trapped in the covering layer. The trapped waste ash "a" is melted by the actions of the heat conducted from the covering layer and the radiant heat. The primary melt runs down to the bottom section of the primary melting furnace 6, and drops into the secondary melting furnace 8. This condition is illustrated in FIG. 5.

The secondary melting furnace 8 is maintained at about 1650° C. by a heavy oil burning burner 9, and the primary melt supplied to the secondary melting furnace 8 is raised to 1500° C. by the radiative heat. The melt is retained in the secondary melting furnace 8 for not less than one hour to heat the melt evenly throughout and to homogenize the melt, as well as removing gaseous matters produced by various reactions and entrappad gases. The melt "b" (the secondary melt) dropped from the secondary melting furnace 8 is placed in a shaping apparatus 30 to produce a shaped glassy material. The main body 300 of the shaping apparatus 30 is provided with metal molds 301 of a size equal to the size of the tiles or blocks to be produced. Before the melt is received in the mold 301, the upper and lower sections of the mold 301 are heated to provide a temperature range between 400° to 600° C. by the gas from the temperature adjuster 302. After receiving a certain amount of the melt in the mold 301, the shut-off valve 305 is closed, and the melt "b" is cooled so that the temperature difference between the upper and lower sections will be not more than 100° C. by adjusting the amount of flow of cooling gas through the adjustments of the dampers 303, 304 to obtain a crystallized glass product L. The shaped glassy material L is removed from the shaping apparatus 30 at a removal temperature between 200° to 700° C., and the placed in an electrically heated crystallization furnace (not shown). The glassy material L is heated at a rate of 5° C. per minute starting from the removal temperature to 850° C., and the glassy material L is held for one hour at this temperature. The glassy material L is then heated again to 1050° C. at a rate of 5° C. per minute, and it is held at this temperature for four hours to crystallize the glassy material L. The glassy material L is cooled to room temperature to produce a crystallized shaped product, and the properties were evaluated.

The operation of the above-presented apparatus will be described in the following. The waste ashes used in this example were the same as those shown in Table 1, and the composition adjusters A, B and C were the same as those shown in Table 1. The glass compositions using the composition adjusted ashes and their melting conditions are shown in Table 6.

The conditions for shaping the formed glasses, the evaluation results of the formed glass samples and the evaluation results of the crystallized glass product samples are shown in Table 7.

In Table 7, crosses are for samples showing cracks or fractures; triangles are for those showing no cracks or fractures but showing uncrystallized center upon cutting of the crystallized samples; and circles are for good samples. For the samples produced in the examples of the present invention in Table 7, X-ray diffraction analyses for confirming the presence or absence of precipitated anorthite crystals, compression strength tests, thermal expansion tests, acid resistance, alkaline resistance, water absorption and specific gravity were carried out in accordance with JIS (Japanese Industrial Standards) requirements. The results are reported in Table 8, together with the results of evaluation on natural granite. Tile evaluation tests for some of the product samples are shown in Table 9.

As confirmed by the results shown in these Tables, the crystallized glass products produced in the apparatus and method of the present invention have the same degree of strength and chemical properties as those shown by natural granite sample.

TABLE 1

| WASTE ASH COMPOSITION | Adjustment A | | Adjustment B | | Adjustment C | |
|---|---|---|---|---|---|---|
| | Ash A | After Adj | Ash B | After Adj | Ash C | After Adj |
| $SiO_2$ | 42.3 | 35.0 | 44.1 | 43.2 | 41.7 | 35.5 |
| $Al_2O_3$ | 20.4 | 19.8 | 18.6 | 11.8 | 15.5 | 18.7 |
| CaO | 6.5 | 38.0 | 6.5 | 20.3 | 6.9 | 32.0 |
| MgO | 2.2 | | 2.5 | | 2.1 | |
| $Fe_2O_3$ | 9.5 | 5.0 | 7.7 | 10.3 | 8.3 | 6.4 |
| $P_2O_5$ | 6.2 | | 9.1 | | 13.0 | |
| $Na_2O$ | 0.8 | | 0.5 | | 0.5 | |
| $K_2O$ | 1.4 | | 0.9 | | 0.8 | |
| Others | 10.7 | | 10.1 | | 11.2 | |
| C | | 0.3 | | 5.0 | | 1.2 |
| S | | 2.0 | | 0.8 | | 2.8 |
| Y | | 0.69 | | 0.37 | | 0.59 |

TABLE 2

| Present Examples | Adjusting Condition | P. Melting Temp. (°C.) | P. Melting Time (min) | S. Melting Temp. (°C.) | S. Melting Time (min) |
|---|---|---|---|---|---|
| 1 | A | 1350 | 40 | 1450 | 15 |
| 2 | B | 1400 | 20 | 1450 | 25 |
| 3 | A | 1350 | 30 | 1500 | 20 |
| 4 | C | 1400 | 25 | 1500 | 30 |
| 5 | A | 1350 | 40 | 1400 | 35 |
| 6 | B | 1400 | 20 | 1450 | 20 |
| 7 | C | 1400 | 30 | 1450 | 15 |
| 8 | A | 1350 | 35 | 1500 | 15 |
| 9 | B | 1400 | 40 | 1450 | 25 |
| Over Range | | | | | |
| 10 | A | 1350 | 30 | 1400 | 30 |
| 11 | B | 1400 | 25 | 1450 | 10 |
| 12 | A | 1350 | 40 | 1500 | 15 |
| 13 | C | 1400 | 30 | 1400 | 30 |

TABLE 3

| Present Examples | Ir Glass Forming Method | Ir. Glass size (mm) | P. Holding Temperature (°C.) | P. Holding Time (min) | S. Melting Temperature (°C.) | S. Melting Time (min) | Quality Judgement |
|---|---|---|---|---|---|---|---|
| 1 | Water Jet | 0.5–2 | 800 | 5 | 1050 | 15 | ○ |
| 2 | " | 0.5–2 | 850 | 10 | 1100 | 10 | ○ |
| 3 | " | 2–5 | 900 | 10 | 1000 | 25 | ○ |
| 4 | " | 2–5 | 850 | 15 | 1050 | 20 | ○ |
| 5 | Air Cool | 5–30 | 800 | 20 | 1100 | 30 | ○ |
| 6 | " | 5–30 | 850 | 30 | 1050 | 25 | ○ |
| 7 | " | 30–100 | 900 | 15 | 1050 | 40 | ○ |
| 8 | " | 30–100 | 850 | 25 | 1100 | 110 | ○ |
| 9 | " | 30–100 | 800 | 30 | 1050 | 80 | ○ |
| Over Range | | | | | | | |
| 10 | Air Cool | 5–30 | 850 | 20 | 950 | 10 | x |
| 11 | " | 30–100 | 900 | 30 | 1100 | 30 | Δ |
| 12 | Water Jet | 0.5–2 | 750 | 3 | 1050 | 20 | Δ |
| 13 | " | 2–5 | 850 | 10 | 1000 | 5 | Δ |

TABLE 4

| Present Examples | Anorthite Detected | Compressive Strength (Kgf/cm$^2$) | Acid Resistance (%) | Alkaline Resistance (%) | Water Absorption (%) | Specific Gravity |
|---|---|---|---|---|---|---|
| 1 | Yes | 1280 | 0.13 | 0.06 | 0.0 | 3.10 |
| 2 | " | 1300 | 0.12 | 0.08 | 0.0 | 3.05 |
| 3 | " | 1350 | 0.16 | 0.09 | 0.05 | 3.15 |
| 4 | " | 1420 | 0.09 | 0.05 | 0.0 | 3.06 |
| 5 | " | 1460 | 0.18 | 0.08 | 0.0 | 3.10 |
| 6 | " | 1520 | 0.30 | 0.04 | 0.0 | 3.15 |
| 7 | " | 1440 | 0.15 | 0.06 | 0.0 | 3.10 |
| 8 | " | 1380 | 0.25 | 0.10 | 0.0 | 3.05 |
| 9 | " | 1460 | 0.18 | 0.09 | 0.0 | 3.04 |
| Natural Marble | — | 1200 | 8.5 | 0.30 | 0.2 | 2.71 |

TABLE 5

| Mixing Ratio (%) | | Test Items | | |
|---|---|---|---|---|
| Crystal Glass | Marble | Bending Strength (Kgf/cm²) | Impact Test | Sliding Test |
| 100 | 0 | 820 | No Crack | Good |
| 80 | 20 | 780 | " | " |
| 60 | 40 | 730 | " | " |
| 40 | 60 | 810 | " | " |
| 20 | 80 | 760 | " | " |
| 0 | 100 | 800 | " | " |
| Reference Standard | JIS A 5415 | 550 | " | " |

Wet road resistance is over 65

TABLE 6

| Present Examples | Adjusting Condition | P. Melting Temperature (°C.) | P. Melting Time (min) | S. Melting Temperature (°C.) | S. Melting Time (Hr) |
|---|---|---|---|---|---|
| 1 | C | 1450 | 40 | 1450 | 1.5 |
| 2 | A | 1400 | 20 | 1450 | 2.5 |
| 3 | B | 1300 | 30 | 1500 | 2.0 |
| 4 | C | 1350 | 25 | 1500 | 2.0 |
| 5 | A | 1400 | 40 | 1400 | 3.0 |
| 6 | B | 1350 | 20 | 1450 | 2.0 |
| 7 | A | 1400 | 30 | 1450 | 1.5 |
| 8 | C | 1400 | 35 | 1500 | 1.5 |
| 9 | B | 1350 | 40 | 1450 | 2.5 |
| Over Range | | | | | |
| 10 | A | 1350 | 30 | 1400 | 1.5 |
| 11 | B | 1400 | 25 | 1450 | 0.75 |
| 12 | A | 1350 | 40 | 1500 | 1.0 |
| 13 | C | 1400 | 30 | 1400 | 0.5 |

TABLE 7

| Present Examples | W × L × T (mm) | Sourr Temp. (°C.) | Temp.Diff. (°C.) | Time (Hr) | Glass Temp. (°C.) | Quality Judgement | |
|---|---|---|---|---|---|---|---|
| | | | | | | Form Glass | Aft. Cryst |
| 1 | 100 × 100 × 10 | 450 | 90 | 3.0 | 650 | o | o |
| 2 | 200 × 200 × 15 | 550 | 85 | 4.0 | 600 | o | o |
| 3 | 300 × 300 × 25 | 600 | 100 | 2.0 | 650 | o | o |
| 4 | 400 × 400 × 30 | 500 | 50 | 2.5 | 700 | o | o |
| 5 | 50 × 50 × 50 | 450 | 80 | 3.0 | 600 | o | o |
| 6 | 100 × 100 × 100 | 600 | 95 | 4.0 | 500 | o | o |
| 7 | 200 × 200 × 20 | 550 | 60 | 2.5 | 700 | o | o |
| 8 | 200 × 200 × 30 | 500 | 85 | 2.5 | 680 | o | o |
| 9 | 400 × 400 × 15 | 600 | 70 | 3.0 | 700 | o | o |
| Over Range | | | | | | | |
| 10 | 200 × 200 × 15 | 350 | 155 | 2.0 | 650 | x | — |
| 11 | 100 × 100 × 10 | 700 | 60 | 5.5 | 400 | o | Δ |
| 12 | 50 × 50 × 50 | 600 | 120 | 4.0 | 550 | x | — |
| 13 | 300 × 300 × 20 | 300 | 180 | 4.0 | 300 | x | — |

TABLE 8

| Present Examples | Anorthite Detected | Compressive Strength (Kgf/cm$^2$) | Thermal Expansion (10$^{-7}$/°C.) | Acid Resistance (%) | Alkaline Resistance (%) | Water Absorption (%) | Specific Gravity |
| --- | --- | --- | --- | --- | --- | --- | --- |
| 1 | YES | 1600 | 78 | 0.10 | 0.04 | 0.0 | 3.04 |
| 2 | " | 1550 | 73 | 0.15 | 0.07 | 0.0 | 3.06 |
| 3 | " | 1580 | 77 | 0.11 | 0.06 | 0.05 | 3.09 |
| 4 | " | 1540 | 72 | 0.16 | 0.09 | 0.0 | 3.07 |
| 5 | " | 1560 | 79 | 0.09 | 0.04 | 0.0 | 3.01 |
| 6 | " | 1520 | 76 | 0.18 | 0.06 | 0.0 | 3.08 |
| 7 | " | 1550 | 80 | 0.22 | 0.05 | 0.0 | 3.06 |
| 8 | " | 1530 | 73 | 0.15 | 0.08 | 0.0 | 3.11 |
| 9 | " | 1575 | 72 | 0.24 | 0.03 | 0.0 | 3.10 |
| Granite | | 1520 | 83 | 1.1 | 0.1 | 0.8 | 2.7 |

TABLE 9

| | Test Items | | | |
| --- | --- | --- | --- | --- |
| Present Glass | Bending Strength (Kgf/cm$^2$) | Impact Test | Wear Test (loss in gram) | Freeze/ Thaw Test |
| 1 | 620 | No Crack | 0.010 | Good* |
| 2 | 580 | " | 0.005 | " |
| 4 | 600 | " | 0.006 | " |
| 5 | 560 | " | 0.008 | " |
| 7 | 560 | " | 0.004 | " |
| 9 | 630 | " | 0.007 | " |
| Reference Standard | | " | <0.1 | " |

*Good indicates that there was no cracking or flaking.

What is claimed is:

1. An apparatus for making crystallized glass product by melting a waste material including a waste ash and a calcined material of a waste slurry from sewage and industrial water treatment facilities, producing a glassy material and subjecting said glassy material to a crystallization step to produce said crystallized glass product, said apparatus comprising:

a main hopper for storing said waste material;

an auxiliary hopper for storing an additive to adjust the composition of said waste material for glass melting;

a mixer for mixing materials supplied by said main and auxiliary hoppers to make a mixed raw material for glass melting;

a constant rate feeder for supplying said mixed raw material for melting;

a primary melting furnace of a circular type for producing a primary melt from said mixed raw material;

a secondary melting furnace connected to said primary furnace at one end and having a melt discharge at another end, for homogenizing and refining the primary melt;

a cooling and shaping apparatus having one end disposed at the melt discharge end of said secondary melting furnace and having a discharge at another end for producing a glass material; and a crystallization furnace disposed at the discharge end of said cooling and shaping apparatus for nucleating said glass material and converting said glass material to said crystallized glass product, wherein said crystallization furnace includes a rotary section in its middle, stationary sections disposed at both ends of the rotary section, and a cylindrical dam disposed inside of said rotary section dividing the inside into a nucleation chamber and a crystallization chamber, wherein nucleation and crystallization can be conducted at different temperatures.

2. An apparatus for making crystallized glass product as claimed in claim 1, wherein said additive for adjusting the composition of said waste material is calcined limestone, and the calcined limestone facilitates the melting of said mixed raw material.

3. An apparatus for making crystallized glass product as claimed in claim 1, wherein:

said primary furnace is inclined from a high material feed end to a low end connected to said secondary furnace, and the inner surface of said primary furnace is self-lined for high-temperature melting; and said secondary furnace is operatively connected with said primary furnace, is horizontally disposed, and possesses a curtain wall to divide the furnace atmosphere of said secondary furnace into two chambers in order to prevent unmelted material from flowing into the melt discharge end of said secondary furnace and in order to make homogeneous glass melt.

4. An apparatus for making crystallized glass product as claimed in claim 1, wherein said mixed raw material is blown tangentially into said primary furnace, said primary furnace operates at a temperature of more than 1300° C. in order to melt said mixed raw material, said secondary furnace operates at a temperature of more than 1400° C. in order to further melt the primary melt, and said crystallization furnace operates at a temperature range from 1000° C. to 1100° C., after said crystallization furnace performs nucleation at a temperature range from 800° C. to 900° C., in order to crystallize the glass product formed by said cooling and shaping apparatus.

5. An apparatus for making crystallized glass product as claimed in claim 1, further comprising:

a gas temperature adjuster for heating said crystallization furnace, wherein an exhaust gas from said primary melting furnace is supplied to said crystallization furnace via said gas temperature adjuster; and an air preheater for preheating secondary air supplied to a burner for heating said primary melting furnace, said secondary air being supplied by a heated process gas exhausted from said crystallization furnace.

* * * * *